United States Patent
Rehnelt (10) Patent No.: US 11,748,504 B2
(45) Date of Patent: Sep. 5, 2023

(54) METHOD FOR SETTING UP A SECURE HIERARCHICAL REFERENCING SYSTEM

(71) Applicant: SECLOUS GMBH, Fürth (DE)

(72) Inventor: Kai Rehnelt, Munich (DE)

(73) Assignee: SECLOUS GMBH, Fürth (DE)

( * ) Notice: Subject to any disclaimer, the term of this patent is extended or adjusted under 35 U.S.C. 154(b) by 318 days.

(21) Appl. No.: 17/257,684

(22) PCT Filed: Jul. 12, 2018

(86) PCT No.: PCT/EP2018/068919
§ 371 (c)(1),
(2) Date: Jan. 4, 2021

(87) PCT Pub. No.: WO2020/011358
PCT Pub. Date: Jan. 16, 2020

(65) Prior Publication Data
US 2022/0129574 A1    Apr. 28, 2022

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01); *G06F 2221/2107* (2013.01); *G06F 2221/2141* (2013.01)

(58) Field of Classification Search
CPC .............. G06F 21/6218; G06F 21/602; G06F 2221/2107; G06F 2221/2141; H04L 9/0891; H04L 9/3242; H04L 9/0861
See application file for complete search history.

(56) References Cited

U.S. PATENT DOCUMENTS

| | | | |
|---|---|---|---|
| 7,203,317 B2 | 4/2007 | Kallahalla et al. | |
| 8,005,227 B1 * | 8/2011 | Linnell | H04L 9/0894 380/278 |
| 2002/0194209 A1 * | 12/2002 | Bolosky | H04L 9/3239 |

OTHER PUBLICATIONS

Geron, et al., "CRUST: Cryptographic Remote Untrusted Storage without Public Keys", International Association for Cryptologic Research, Jul. 10, 2007, pp. 1-32.

(Continued)

*Primary Examiner* — Han Yang
(74) *Attorney, Agent, or Firm* — Kilpatrick Townsend & Stockton LLP (57) ABSTRACT

A performance-optimized secure hierarchical referencing system, for example to implement a cryptographic file system (CFS) in which files or other data are stored in a cryptographic tree structure on a untrusted environment. The system operates by using adaptive cryptographic access control (ACAC) whereby the data on the client (user) side is encrypted using keys. All said keys (with the exception of an entry key) are not stored but are calculated, and a dedicated symmetric key is used for each element in the referencing system (e.g. files, records, comments) to ensure that read/write permissions can be distributed to selected third parties at element level and actively revoked where required (sharing/revocation).

5 Claims, 8 Drawing Sheets

Derived key calculation on element level (56) References Cited

OTHER PUBLICATIONS

Kallahalla, et al., "Proceedings of FAST '03: 2nd USENIX Conference on File and Storage Technologies", USENIX Association, Mar. 31-Apr. 2, 2003, pp. 29-42.
International Application No. PCT/EP2018/068919, "International Search Report and Written Opinion", dated Mar. 6, 2019, 11 pages.
Atallah, et al., "Dynamic and Efficient Key Management for Access Hierarchies", Department of Computer Science, Purdue University, Nov. 2005, 12 pages.

* cited by examiner

● Permission Group 1
(e.g. C:\Data)

| Key list | | Reference list | |
|---|---|---|---|
| Key | | Element | Key |
| 1 | 🔑 | File 1 | 1 |
| 2 | 🔑 | File 2 | 3 |
| 3 | 🔑 | File 3 | 3 |
| 4 | 🔑 | File 4 | 2 |
| | | File 5 | 4 |
| | | File 6 | 2 |
| | | File 7 | 1 |
| | | File 8 | 2 |

● Permission Group 2
(e.g. C:\Data\Logs)

| Key list | | Reference list | |
|---|---|---|---|
| Key | | Element | Key |
| 1 | 🔑 | File 1 | 3 |
| 2 | 🔑 | File 2 | 3 |
| 3 | 🔑 | File 3 | 1 |
| | | File 4 | 2 |
| | | File 5 | 1 |
| | | File 6 | 2 |

*State of art are independend key and reference lists per permission group*

Figure 1

*Derived key calculation on element level*

| Parameter | Abbrev.: | Initial set value |
|---|---|---|
| CURRENT matching index | C_MIND | 0 |
| NEXT matching index | N_MIND | FIRST parent data node index (PDNI) |
| Matching interval | MINT | 1 |
| Matching interval counter | CMINT_C | 0 |
| Compressed data node key parameter list | DNKPL | Initially empty, calculated in accordance with Claim 4 |

Figure 7

|  | *Initial* | \multicolumn{10}{c}{Comparison steps} |
| --- | --- | --- | --- | --- | --- | --- | --- | --- | --- | --- | --- |

| | *Initial* | 1 | 2 | 3 | 4 | 5 | 6 | 7 | 8 | 9 | 10 |
| --- | --- | --- | --- | --- | --- | --- | --- | --- | --- | --- | --- |
| Current matching index | 0 | 0 | 1 | 1 | 1 | 2 | 3 | 4 | 7 | 8 | 9 |
| Next matching index | 1 | 1 | 1 | 1 | 2 | 3 | 4 | 7 | 8 | 9 | |
| *Difference of matching indizes* | | 1 | 0 | 0 | 1 | 1 | 1 | 3 | 1 | 1 | |
| *Difference equals current matching interval from above calculation?* | ? | Yes | No | Yes | No | Yes | Yes | No | Yes | Yes | |
| Current matching Interval MINT | 1 | 1 | 0 | 0 | 1 | 1 | 1 | 1 | 1 | 1 | |
| Matching interval counter MINT_C (incremented by 1, in case difference equals matching interval) | 0 | 1 | 1 | 2 | 1 | 2 | 3 | 0 | 1 | 2 | |

Resulting compressed list

| | | | 1 | 1 | 1 | 1 | 1 | 1 | 1 | 1 |
| --- | --- | --- | --- | --- | --- | --- | --- | --- | --- | --- |
| | | | | 2 | 2 | 2 | 2 | 2 | 2 | 2 |
| | | | | | | | 3 | 3 | 3 | |
| | | | | | | | -3 | -3 | -3 | |
| | | | | | | | | | 2 | |

Data node key parameter list

| Uncompressed list | Compressed list |
| --- | --- |
| 1 | 1 |
| 1 | 2 |
| 1 | 3 |
| 2 | -3 |
| 3 | 2 |
| 4 | |
| 7 | |
| 8 | |
| 9 | |

*(Hatching used to improve legibility)*

Figure 8

METHOD FOR SETTING UP A SECURE HIERARCHICAL REFERENCING SYSTEM

CROSS-REFERENCE TO RELATED APPLICATION

This application is a U.S. national phase of International Patent Application No. PCT/EP20181068919 filed on Jul. 12, 2018, the entire contents of which are hereby incorporated herein by this reference.

DESCRIPTION

The aim of the present invention is to provide a performance-optimized secure hierarchical referencing system, for example to implement a cryptographic file system (CFS) in which files or other data are stored in a cryptographic tree structure on a untrusted environment. This operates by using adaptive cryptographic access control (ACAC) whereby the data on the client (user) side is encrypted using keys. All said keys (with the exception of an entry key) should not be stored but calculated, and a dedicated symmetric key used for each element in the referencing system (e.g. files, records, comments) to ensure that read/write permissions can be distributed to selected third parties at element level and actively revoked where required (sharing/revocation).

This referencing system thereby replaces conventional access control and authentication methods and due to the symmetric keys on an individual element basis enables not only efficient, error-tolerant access, but in particular also the possibility of the active removal of individual elements.

For reasons of efficiency a lazy revocation approach is used for encryption, i.e. a new key is not generated immediately after a user is revoked but only when the data is stored.

STATE OF THE ART

There is no method at the current state of the art that is capable of meeting the above aims. Known methods cover some individual aspects of the requirements but cannot be combined at the current state of the art.

The aim of "not storing" keys can be achieved using so-called depended key models such as the key derivation algorithm method (KDA) since all keys used are calculated and not randomly generated. However, this method is counter to the aim of an efficient referencing system since complete re-encryption of all referenced data elements is required when permissions are revoked (active revocation).

This performance problem would be solved by the lazy revocation approach. Lazy revocation is a key requirement for current cloud storage systems, particularly where a user group shares very large quantities of data. In contradistinction to the active revocation method, where following revocation of data within a client-based encryption method all data must first be downloaded to the client, encrypted with new keys, and the re-encrypted data uploaded back onto the server, in the lazy revocation method data must only be re-encrypted if it has changed, in which case it would in any event require re-encryption.

Lazy revocation therefore represents a compromise in which persons who previously had access to the encrypted data continue to have access to that data provided that the data has not changed.

Security is guaranteed under lazy revocation since data continues to be protected by the current encryption unless changed, and new or changed data is encrypted with new keys, and said keys are distributed to the users who continue to have permission to access said data even after access is revoked for others.

At the current state of the art, however, the lazy revocation method is counter to KDA since it would interrupt the concatenation of keys starting with the entry key (in KDA each subordinate key is calculated using its predecessor, whilst under lazy revocation an element may have several keys distributed to it, whereby the key calculation is no longer unique). Under the lazy revocation approach, therefore, all keys used must be stored and distributed (resulting in an independent key model), which is counter to the aim of not storing any keys. A compromise under the state of the art is the key management method of Atallah, Frikken and Blanton (and variants thereof) where under the independent key model the need to distribute keys to all parties is replaced by the introduction of public auxiliary values for each element, whereby said values are calculated from the hash of the parent key minus the value of the node key. A node key is calculated in a similar way by subtracting the hash of the auxiliary key from the hash of the parent key. However in this case the public auxiliary keys must be stored for each element and the loss of an auxiliary key thus entails the loss of all subordinate node keys. This is counter to the aim of achieving a secure and error-tolerant referencing system.

A further major disadvantage of lazy revocation is that key management (key generation and distribution) requires considerable processor power over long periods and has high overheads due to the need to store the keys. In order to fulfill the aim of the invention that independently interchangeable keys can be used for each individual data element, each individual key would have to be stored under the lazy revocation method. In the event that the data are also to be shared with third parties, this key would even have to be encrypted (for example with the third party's public RSA key). It would thus be necessary, for example, when sharing data with 3 parties to store 4 encrypted keys (encrypted once with the client's own key and then with each of the third parties' public keys). If we posit a system with large amounts of data and users it becomes clear why, due to the overheads and complexity of key management, lazy revocation on an individual element basis is not applied in practice—otherwise it would be necessary to store and distribute a specific key for each data node and user as described and implement this every time users were added or, in particular, revoked. This cannot achieve the aim of an efficient referencing system for each element.

In order to render it applicable in practice, the number of stored keys required must be reduced. At the state of the art this is achieved by aggregating data within permissions groups (for example, files in directories) whereby all data within the same permissions group can be encrypted with the same keys. Each permissions group must be able to replace their keys independently of the keys for the other permissions groups. This independence means it is no longer necessary to re-encrypt data within a permissions group immediately after permission is revoked from a third party, but instead it is sufficient to recursively mark (the term of art being "dirty flag") elements on the tree (e.g. sub-directories and files). This means that the system only checks whether this mark is set when data is stored (changed, added) (and if so, a new key must be generated for this permissions group and distributed to all authorized third parties) or whether it is sufficient to use a current key (if the "dirty flag" is not set). Once the data is encrypted with a new key the dirty flag is removed for that permissions group.

This still leaves the distribution issue (though for fewer keys), with the system no longer able to reference to individual data items, but only to permissions groups (e.g. directories, datarooms). Furthermore, for every element (such as a file) in the group, a reference must be created to the key used for that element, since this method may mean there are several keys per permissions group.

This could be achieved at the state of the art with 2 lists assigned to the permissions group. One of these being a key list in which all keys used in the respective permissions group are stored in unencrypted form, and the second a reference list in which all elements (files) of the permissions group are stored together with a link to the key used to encrypt the element.

To optimize storage and calculation, said key lists can be achieved at the state of the art by cryptographic links such as:

A) Through a hash list, whereby in each case the current key is calculated as NewKey=Secure Hash (FormerKey, "Salt").

In this case a list is generated with a preset number of elements (keys) by a concatenation of hashes based on a single starting point. Normally the calculation is supplemented by a random sequence of characters (known as "salt") to increase the entropy of the calculation. One of the results of this concatenated list is that any element (key) on this list can be distributed including its position and used to calculate the succeeding elements is (keys). However it is not possible to use it to calculate former keys from the starting point, since secure hash functions are one-way functions. When a new key is required, the former element (key), i.e. that preceding the current element (key) must be disclosed by the person who has calculated the hash list of sufficient length.

In such a list, therefore, the last entry in the list must be stored for the owner (or it must be calculable using secret information), from which all former keys can be calculated. Here, the last element in the list corresponds to the first key, the penultimate element to the second key etc.

The advantage of only needing to store a single key for access is therefore purchased at the cost of the need for a preset length. If the length is set too low, there may not be sufficient keys available; if it is set too high, this would result in long, unnecessary calculation times since the calculation would start with the last element involved (for example, if the length was set at a million, but there are currently only 3 keys, all keys would have to be calculated starting with the millionth entry down to the third key). This option is practically never used for this reason.

B) As a key list, whereby the current key is not calculated using a hash function but via symmetric or asymmetric encryption such that CurrentKey=AES_decrypt (CurrentKey, SuccessorKey) (cf, for example, U.S. Pat. No. 7,203,317B2).

In this case the length of the list is not set from the start and can be extended at any time. Each respective current key is encrypted with its successor (user-defined) key. In contrast with the hash lists, however, an entry (the user-defined successor key) must be stored for each node.

This means that there is a plurality of current keys for the same data and the base keys for each of these must be stored. Furthermore, it must be ensured that all keys used are present for each node and authorized party, which gives rise to problems with error tolerance.

Furthermore, keys cannot be discarded until it is ensured that they are no longer used to encrypt data. The overheads and complexity of key storage and distribution increase accordingly.

A new method is therefore required to address the above problems and disadvantages and achieve the aims described at the outset. This new method draws on existing methods but optimizes and supplements them with new process steps, resulting in the present invention.

PROCEDURE

For the purpose of simplification of key management and minimizing storage of keys under the lazy revocation approach, in the present invention data node keys are derived from the data node key of the parent data node and others. However since lazy revocation may cause child nodes to have an older key than the parent node, it is necessary to note exactly which version of the parent key is current.

Since the parent data node key can change independently, a major aspect of this invention is the maintenance of a temporary (volatile) data node key list for each data node, in which the key indices distributed to the respective keys are noted. Within this list, the keys assigned to the data node are stored in a numbered list whereby the last entry in the list corresponds to the current key.

It is also necessary to note the parent data node key used to generate each data node for each key. This is achieved according to the invention with the (non-volatile, i.e. stored) data node key parameter list in which the indices of the child and parent keys are linked.

This can be used to discover the keys associated with the stored parent indices for each child data node (thereby revealing the secrets used to calculate the keys of the child nodes).

It is only by combining these two lists that it is possible to use and extend the advantages of active revocation (a single current data node key calculated per data node for encryption and decryption, instead of the need for permanently stored keys) and combine them with the advantages of lazy revocation (only re-encrypting data when stored). This replaces current practice of key storage and distribution by concatenated key calculation. This combination is unknown at the state of the art and not readily apparent to those of ordinary skill in the art. Since the data node keys include (at least) one of the previously used parent data node's data node keys for generation, it is necessary to trace the path of the tree from the root to the data node used for storage to identify the point at which the parent data node has a more current data node key than the parent data node key used as the basis for generating the current data node key, and to update the keys and indices as required, as well as to encrypt the data with the new keys. This ensures that all keys and indices of all parent data nodes along the path have been updated before data assigned to a data node is stored, and thus that the data is encrypted with the valid current key (which revoked users do not possess).

Added Value of the Method

Combination of the advantages of KDA (key calculation using keys of parent nodes instead of storing all keys) and lazy revocation (efficiency gains since only changed data is encrypted) whilst resolving the disadvantages associated with it at the state of the art.

The need for re-encryption of all data nodes under (active) revocation is replaced by a lazy revocation approach.

Instead of multiple keys being required per node, as with lazy revocation (whereby one node may contain many elements) there is only one current calculated key.

The "dirty flag" used in common practice at the current state of the art is replaced by a matching step to check whether the current parent key is identical to the parent key noted in the non-volatile list. Non-identical indices correspond to a dirty flag.

The present method meets all requirements for lazy revocation with the distinguishing feature that only one entry key must be stored in the tree (instead of every key). Furthermore the method allows a single dedicated key to be retained for each node of a tree so that, for example, every file can be encrypted with a different key.

Compared with the lazy revocation method currently in usual practice, data programming and overheads are simplified, since there is no need to recursively mark all data nodes (directories/files/ . . . ) affected by the revocation of permissions as "dirty" or to select a specific data node key from a list in order to decrypt available data nodes.

The simplifications and efficiency gains thus enabled achieve a scalable solution for encryption on an individual element basis which does not permanently store any keys and hugely simplifies key management. It also enables active revocation of permissions on an individual element basis.

Figure 1:
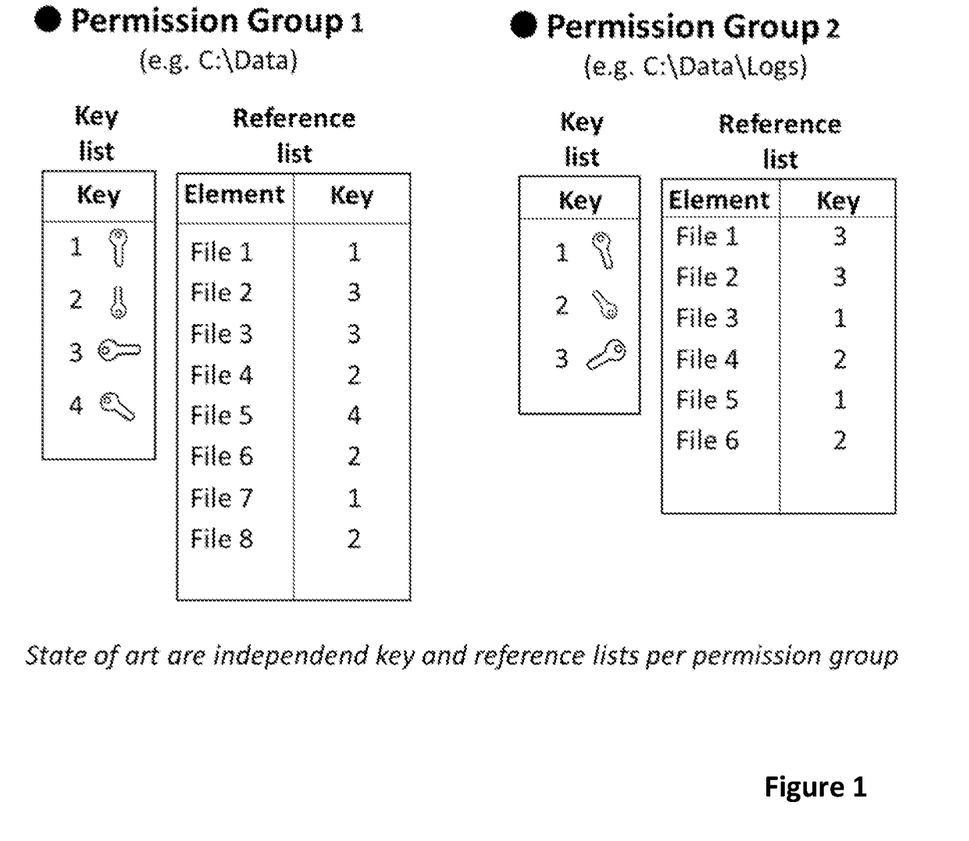
FIG. 1 illustrates an example of the key and reference lists used for lazy revocation at the state of the art.
Figure 2:
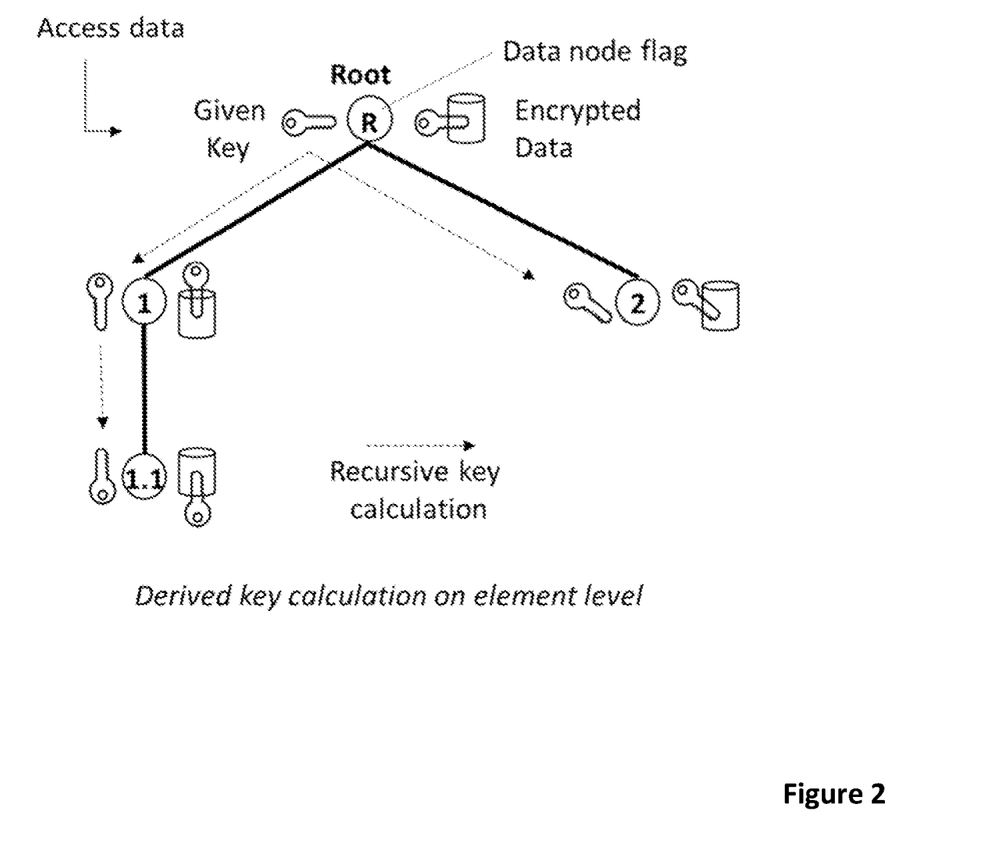
FIG. 2 illustrates the core components according to claim 1 defined in the preamble.
Figure 3:
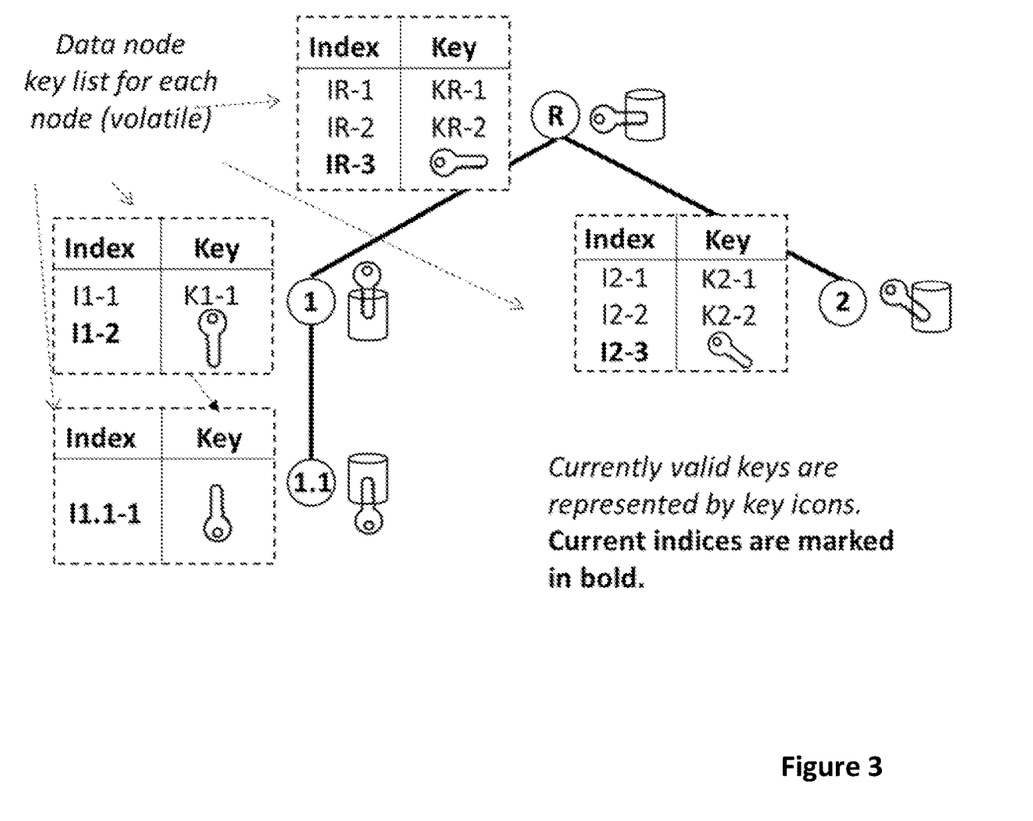
FIG. 3 illustrates an embodiment for adding volatile data node key lists to the key management according to claim 1.
Figure 4:
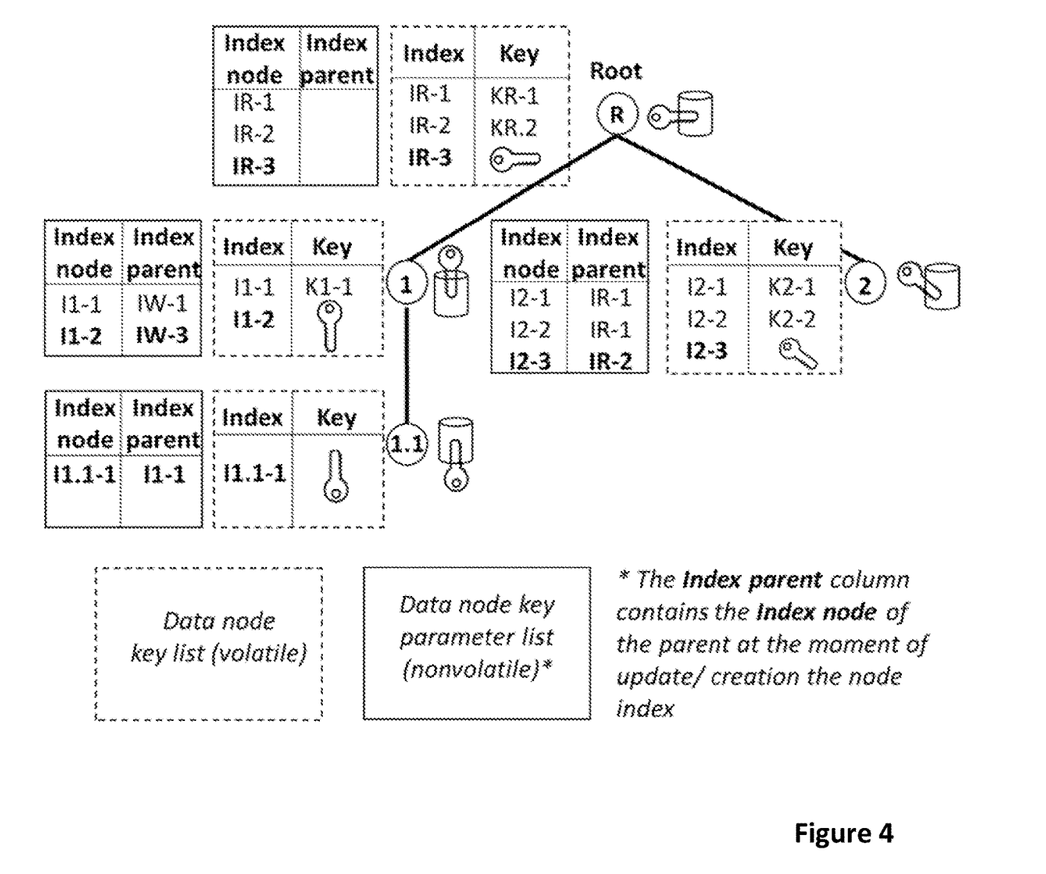
FIG. 4 illustrates an embodiment for adding non-volatile data node key parameter lists for referencing and recalculating indices and keys according to claim 1.
Figure 5:
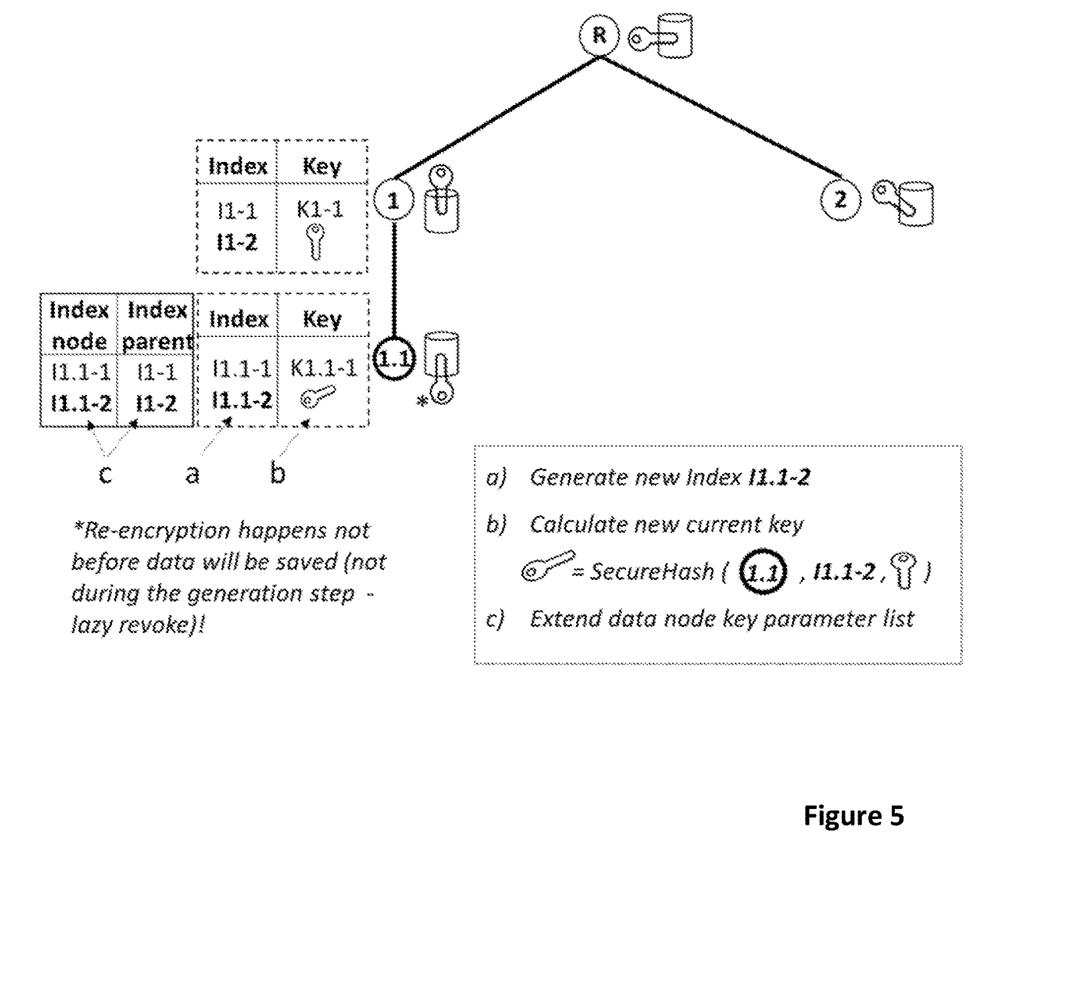
FIG. 5 illustrates an embodiment for implementing the generation step defined in claim 1.
Figure 6:
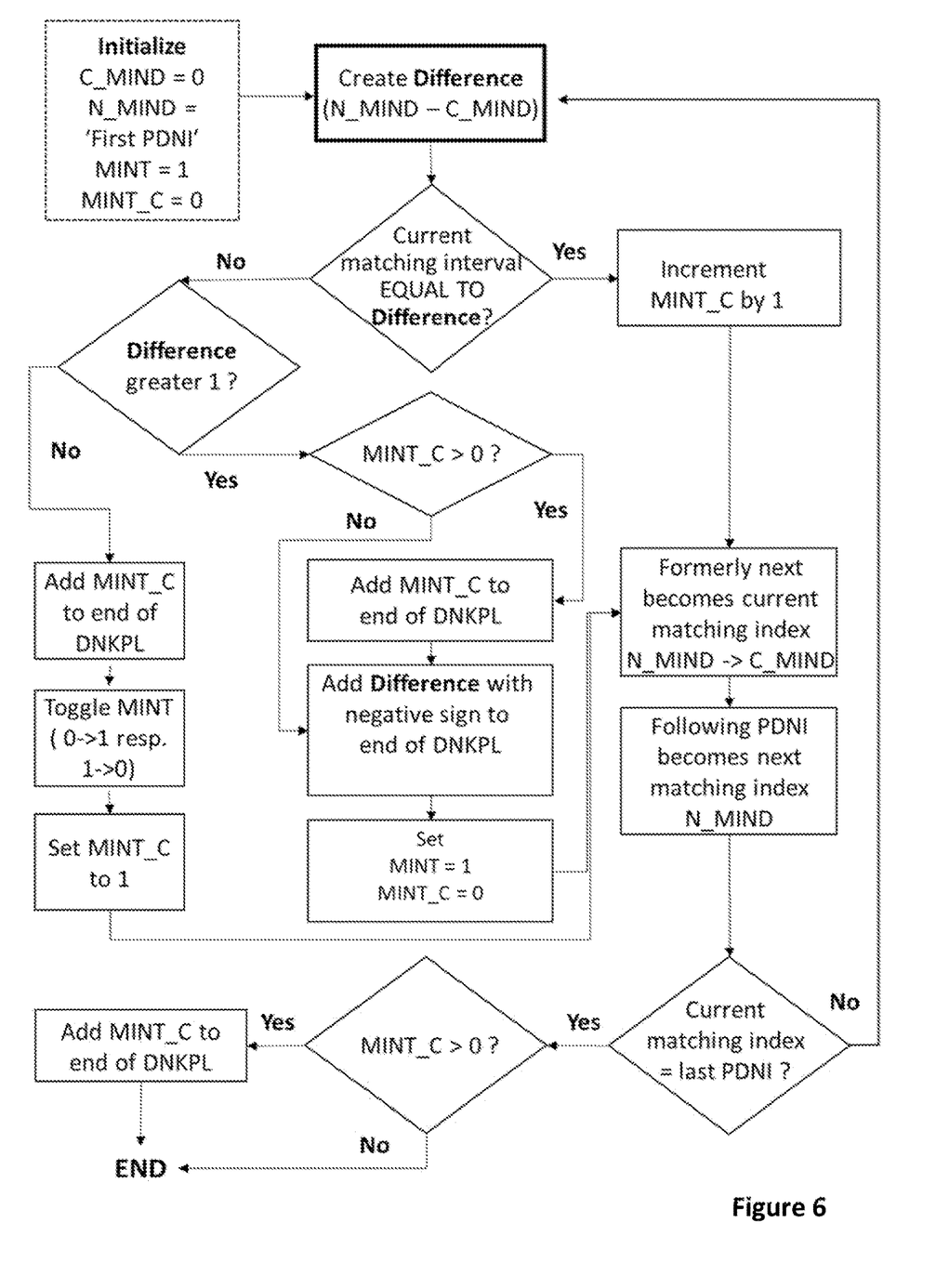
FIG. 6 describes the method for compressed storage of the data node parameter lists according to claim 4.
Figure 7:
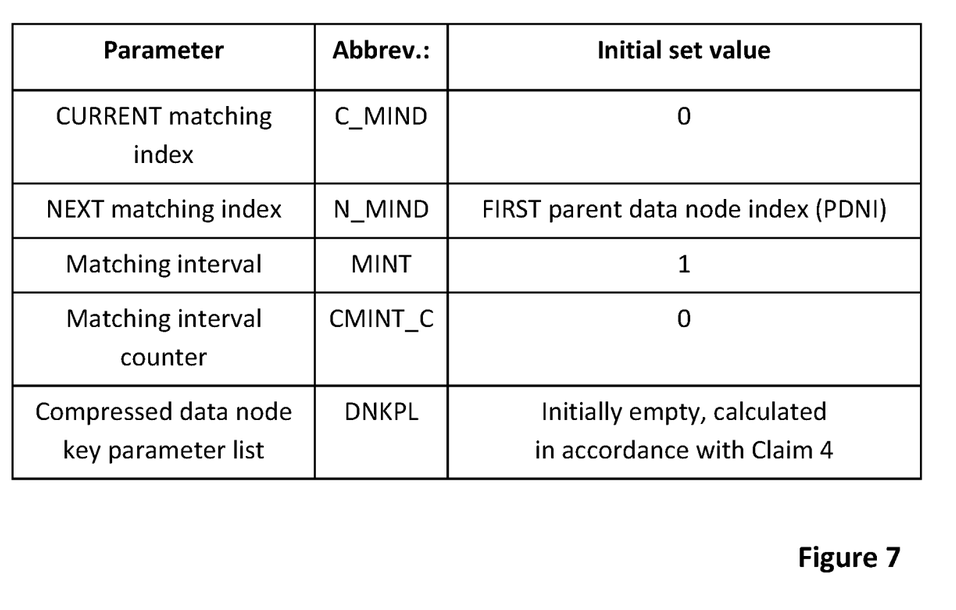
FIG. 7 shows the legend for FIG. 6.
Figure 8:
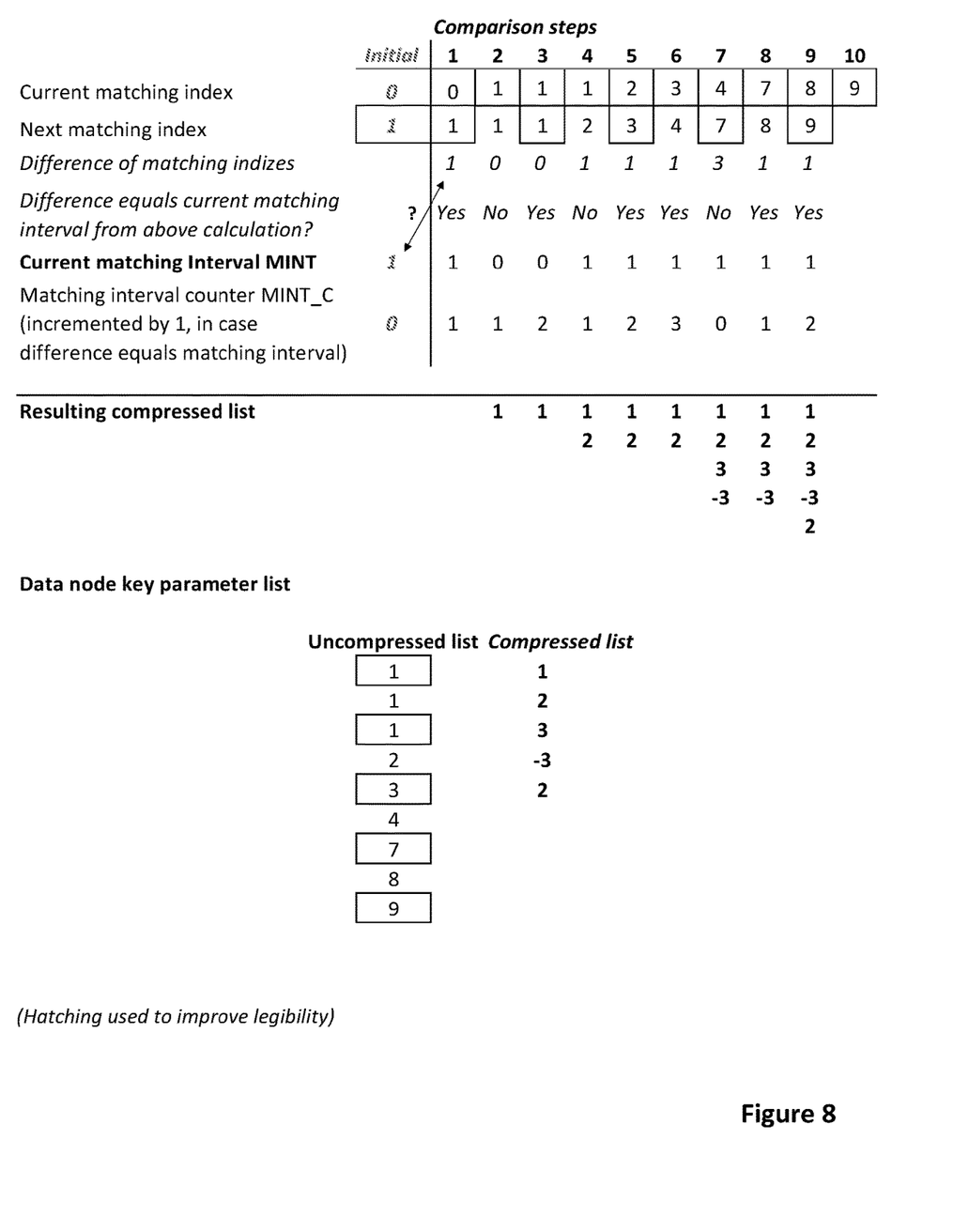
FIG. 8 describes an embodiment according to claim 4.

The invention claimed is:

1. A method for storing and reading data on a storage facility in an untrusted environment, wherein the data is assigned to data nodes on a tree structure, each data node having (i) a data node flag that clearly identifies the data node in relation to one or more sibling data nodes, and (ii) one current data node key, and wherein the tree structure includes a root data node for which at least one data node key is manually specified, and all child data nodes recursively calculate their current data node keys based on the root data node including a current parent data node key, wherein the data is encrypted before being stored on the storage facility with the current data node key of the data node associated with the data and the data is encrypted after being read on the storage facility with the current data node key, the method comprising:

defining a data node key generation step that can be applied to each data node any number of times, time-independently, wherein applying the data node key generation step to a data node comprises:

generating a new data node key index for the data node, calculating an additional data node key and setting the additional data node key as the current data node key by matching a result of a secure hash function applied at least to a data node marker of the data node, the new data node key index, and the current data node key of a parent data node, creating or extending a volatile data node key list containing a data node key index column and a data node key column with an insertion of the new data node key index and the previously calculated additional data node key at an end of the volatile data node key list, the previously calculated additional data node key becoming the current data node key, and creating or extending a non-volatile data node key parameter list containing a data node index column and a parent data node index column, with an insertion of the new data node key index of the data node into the data node index column and a last data node key index from a non-volatile data node key parameter list of the parent data node into the parent data node index column at an end of the non-volatile data node key parameter list so that only public indices are permanently saved; and before data of the data node are saved:

identifying a path in the tree structure from the root data node to the data node, tracking the identified path from a first child data node of the root data node to an additional data node, comparing a last entry in the non-volatile data node key parameter list of the data node to a last entry in the non-volatile data node key parameter list of the parent data node of the data node, and in response to determining that a last entry from the parent data node index column of the data node is not identical with a last entry in the data node index column from the non-volatile data node key parameter list of the parent data node of the data node:

applying the data node key generation step to the data node and each successor data node on the identified path, encrypting particular data of the data node and each successor data node using the current data node key of the data node associated with the particular data, and storing the non-volatile data node key parameter list assigned to the data node.

2. The method according to claim 1, wherein sequential line numbering of the non-volatile data node key parameter list is used as a data node key index for the data node, whereby the new data node key index is calculated by increasing a current last line number by one, wherein the data node index column is not stored in the non-volatile data node key parameter list.

3. The method according to claim 2, wherein the non-volatile data node key parameter list is converted into a compressed data node key parameter list, wherein only the compressed data node key parameter list is stored on the storage facility, and wherein areas within the non-volatile data node key parameter list are combined such that areas with identical entries and areas with sequential entries are represented by corresponding values in the compressed data node key parameter list.

4. The method according to claim 2, further comprising:
converting the non-volatile data node key parameter list into a compressed data node key parameter list wherein only the compressed data node key parameter list is stored on the storage facility, whereby a number 0 is set as a current matching index and a first parent data node index is set in the non-volatile data node key parameter list as a next matching index, a value 1 is set as a current matching interval, and a value 0 is set as a current matching interval counter;
defining a matching step in which a difference between the next matching index and the current matching index is calculated, wherein:
if the calculated difference is equal to the current matching interval, the current matching interval counter is increased by the value 1,
if the calculated difference is not equal to the current matching interval and is greater than the value 1, and provided that the current matching interval counter is greater than the value 0, the current matching interval counter is attached to a last position in the compressed data node key parameter list, a negative sign is appended to the calculated difference and attached at the end of the compressed data node key parameter list, and the current matching interval is set to the value 1 and the current matching interval counter is set to the value 0, and
if the calculated difference is not equal to the current matching interval and is less than or equal to the value 1, the current matching interval counter is attached to the last position in the compressed data node key parameter list, the current matching interval is changed from the value 1 to the value 0 or, from the value 0 to the value 1 and the current matching interval counter is set to the value 1, and the next matching index becomes the current matching index and a subsequent parent data node index becomes the next matching index;
applying the matching step to each current matching index and next matching index until the current matching index corresponds to a last parent data node index; and
attaching the current matching interval counter to the last position in the compressed data node key parameter list, responsive to determining that the current matching interval counter is greater than the value 0.

5. The method according to claim 1, wherein the at least one data node key for the root data node is manually specified by calculation from access data.

* * * * *